(12) United States Patent
Shelestak et al.

(10) Patent No.: US 7,625,830 B2
(45) Date of Patent: Dec. 1, 2009

(54) BLUE GLASS COMPOSITION

(75) Inventors: Larry J. Shelestak, Bairdford, PA (US); James M. Baldauff, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 724 days.

(21) Appl. No.: 11/055,184

(22) Filed: Feb. 10, 2005

(65) Prior Publication Data

US 2006/0178255 A1 Aug. 10, 2006

(51) Int. Cl.
*C03C 3/098* (2006.01)
*C03C 3/087* (2006.01)

(52) U.S. Cl. ............................ 501/64; 501/70; 501/71

(58) Field of Classification Search ................. 501/64, 501/70, 71
See application file for complete search history.

(56) References Cited

U.S. PATENT DOCUMENTS

| | | | | |
|---|---|---|---|---|
| 4,792,536 A * | 12/1988 | Pecoraro et al. | ............... | 501/70 |
| 4,866,010 A | 9/1989 | Boulos et al. | ................. | 501/71 |
| 5,070,048 A | 12/1991 | Boulos et al. | ................. | 501/71 |
| 5,264,400 A * | 11/1993 | Nakaguchi et al. | ............ | 501/71 |
| RE34,639 E | 6/1994 | Boulos et al. | ................. | 501/71 |
| RE34,760 E | 10/1994 | Boulos et al. | ................. | 501/71 |
| 5,688,727 A * | 11/1997 | Shelestak et al. | .............. | 501/71 |
| 5,807,417 A | 9/1998 | Boulos et al. | ............. | 65/134.3 |
| 5,851,940 A | 12/1998 | Boulos et al. | ................. | 501/71 |
| 6,313,053 B1 * | 11/2001 | Shelestak | ...................... | 501/71 |
| 6,403,509 B2 * | 6/2002 | Cochran et al. | ............... | 501/64 |
| 6,416,867 B1 * | 7/2002 | Karpen | ........................ | 428/426 |
| 6,498,118 B1 * | 12/2002 | Landa et al. | .................. | 501/64 |
| 6,573,207 B2 * | 6/2003 | Landa et al. | .................. | 501/64 |
| 6,610,622 B1 * | 8/2003 | Landa et al. | .................. | 501/64 |
| 6,656,862 B1 * | 12/2003 | Krumwiede et al. | .......... | 501/71 |
| 6,716,780 B2 * | 4/2004 | Landa et al. | .................. | 501/64 |
| 6,949,484 B2 * | 9/2005 | Landa et al. | .................. | 501/64 |
| 7,030,047 B2 * | 4/2006 | Landa et al. | .................. | 501/64 |
| 7,037,869 B2 * | 5/2006 | Landa et al. | .................. | 501/64 |
| 7,135,425 B2 * | 11/2006 | Thomsen et al. | ............. | 501/64 |
| 7,326,665 B2 * | 2/2008 | Akada et al. | .................. | 501/64 |
| 2001/0006927 A1 * | 7/2001 | Cochran et al. | ............... | 501/70 |
| 2002/0160901 A1 * | 10/2002 | Landa et al. | .................. | 501/64 |
| 2003/0114290 A1 * | 6/2003 | Landa et al. | .................. | 501/64 |
| 2003/0216241 A1 * | 11/2003 | Landa et al. | .................. | 501/64 |
| 2004/0043886 A1 * | 3/2004 | Akada et al. | .................. | 501/64 |
| 2004/0116271 A1 * | 6/2004 | Thomsen et al. | ............. | 501/71 |
| 2004/0180775 A1 * | 9/2004 | Landa et al. | .................. | 501/64 |
| 2004/0209757 A1 * | 10/2004 | Landa et al. | .................. | 501/64 |
| 2005/0170944 A1 * | 8/2005 | Arbab et al. | .................. | 501/64 |

FOREIGN PATENT DOCUMENTS

EP 0 820 964 B1 12/2001

* cited by examiner

*Primary Examiner*—Karl E Group
*Assistant Examiner*—Elizabeth A Bolden
(74) *Attorney, Agent, or Firm*—Andrew C. Siminerio

(57) ABSTRACT

The present invention provides a blue glass that can be essentially free of selenium and cobalt but still has a blue color and desired luminous transmittance. Additionally, the amount of iron present is comparable to conventional soda-lime-silica glass. The glass of the present invention can have a soda-lime-silica glass base portion, with major colorants that provide the blue color.

11 Claims, No Drawings

BLUE GLASS COMPOSITION

BACKGROUND OF THE INVENTION

1. Field of the Invention

This invention relates generally to a blue glass composition and to articles containing the blue glass.

2. Technical Considerations

A glass considered to be "spectrally selective" is one in which the light to solar heat gain ratio (LSG), which is defined as the total visible light transmittance (TVIS) divided by the solar heat gain coefficient (SHGC), is greater than or equal to 1.25. Examples of such glass are commercially available from PPG Industries, Inc. under the SOLEXIA®, CARIBIA®, AZURIA®, and ATLANTICA® family of glasses. A blue glass that is spectrally selective is very desirable, especially in the commercial trade market (i.e., architectural market).

Blue tint or color in conventional glass is achieved through the addition of one or more colorants. Perhaps the most widely used colorant for blue glass is cobalt oxide. Cobalt oxide is a very powerful blue colorant, with a color vector that is nearly completely in the negative b* direction (more blue) of the CIELAB color system. However, even a small amount of cobalt oxide added to float glass (such as 20 ppm or more) blocks enough visible light to render the glass to be non-spectrally selective.

Another method for making glass that is spectrally selective is by using greater than 0.4% iron oxide as the sole colorant while also adjusting the glass redox ratio to greater than 0.35. This combination gives the highest possible visible light transmittance attainable for the resulting low solar heat gain coefficient. For example, a glass containing 0.6 wt. % total iron and having a glass redox ratio of 0.45 would have an LSG ratio of about 1.35. However, as various other colorants are introduced to the system, the glass can become darker, i.e., the TVIS is reduced, and the LSG ratio can quickly decrease. For instance, adding as little as 20 ppm of cobalt oxide to the glass to try to give the glass a blue tint can lower the LSG ratio to about 1.24. Thus, the addition of cobalt oxide can have a negative impact on the LSG ratio.

Typically, a glass that is spectrally selective exhibits a green to greenish-blue color. In order to make a glass that has a purer blue hue (e.g., dominant wavelength range 480 nm to 495 nm at 6 mm thickness), a green-neutralizing colorant must be added to offset the green component that comes from the combination of $Fe^{+2}$ and $Fe^{+3}$ oxides. Selenium is most typically used for this purpose. The selenium color vector points towards the amber/orange direction. Although it is not directly opposite to the iron color vector, it acts to decolorize the green while adding a yellow component. However, the addition of selenium also has a strong negative impact on the LSG ratio. For example, the addition of just 4 ppm of selenium can lower the LSG ratio from 1.35 down to about 1.24.

Therefore, it is an object of this invention to provide a blue glass that is spectrally selective or non-spectrally selective.

A further object of this invention is to provide a blue glass that has a dominant wavelength in the range of 480 nm to 495 nm.

A still further object of this invention is to provide a blue glass that has desirable solar performance properties.

Another object of this invention is to provide a blue glass that has desirable visible light transmittance properties.

SUMMARY OF THE INVENTION

The present invention provides a blue glass composition providing a blue glass having a blue color and desired luminous transmittance. This glass is capable of use for architectural and/or automotive applications. Additionally, the amount of iron present can be comparable to that in conventional soda-lime-silica glass. The glass of the present invention can have a typical soda-lime-silica glass base portion, with major colorants in accordance with the invention that provide a blue color. The colorant portion can include erbium and/or neodymium and can be essentially free of selenium and/or cobalt.

In one non-limiting embodiment, the major colorants can comprise 0.1 to 0.9 weight percent total iron (expressed as $Fe_2O_3$ as described below), up to 3 weight percent $Er_2O_3$ and/or up to 3 weight percent $Nd_2O_3$. The major colorants can provide the glass with a dominant wavelength in the range of 480 nm to 495 nm, such as 480 nm to 485 nm, and a light to solar heat gain ratio in the range of 0.9 to 1.5.

In another non-limiting embodiment, the major colorants can comprise 0.4 to 0.6 weight percent total iron ($Fe_2O_3$), 0.4 to 3 weight percent $Er_2O_3$, and 0 to 3 weight percent $Nd_2O_3$. The major colorants can provide the glass with a dominant wavelength in the range of 480 nm to 495 nm, such as 480 nm to 485 nm, and a light to solar heat gain (LSG) ratio in the range of 0.9 to 1.5.

In an additional non-limiting embodiment of the invention, the major colorants can comprise 0.1 to 0.9 weight percent total iron ($Fe_2O_3$), and 0.2 to 3 weight percent of $Er_2O_3$ and $Nd_2O_3$. As will be appreciated, the weight percents of $Er_2O_3$ and $Nd_2O_3$ need not be the same.

In yet another embodiment, the major colorants can comprise 0.1 to 0.9 weight percent total iron ($Fe_2O_3$), 0 to 3 weight percent of $Er_2O_3$, and/or 0.1 to 0.25 weight percent of $Nd_2O_3$.

DETAILED DESCRIPTION OF THE INVENTION

Unless otherwise indicated, all numbers expressing dimensions, physical characteristics, quantities of ingredients, reaction conditions and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Additionally, any reference referred to herein is to be understood as being incorporated by reference in its entirety. Any reference to amounts, unless otherwise specified, is "by weight percent" based on the total weight of the final glass composition. The term "total iron" means the total amount of iron in the glass composition expressed in terms of $Fe_2O_3$ and determined using standard analytical practice regardless of the form actually present. The term "FeO" means the amount of iron in the ferrous state expressed in terms of FeO even though it may not actually be in the glass as FeO. The term "redox ratio" means the amount of iron in the ferrous state (expressed as FeO) divided by the amount of total iron (expressed as $Fe_2O_3$). As used herein, selenium is expressed in terms of elemental Se and cobalt is expressed in terms of CoO. Chromium, titanium, erbium and neodymium are expressed as $Cr_2O_3$, $TiO_2$, $Er_2O_3$, and $Nd_2O_3$, respectively. As used herein, the terms "solar control" and "solar control properties" mean characteristics or properties that affect the solar performance properties of the glass, such as visible, infrared (IR) and/or ultraviolet (UV) radiation transmittance and/or reflectance of the glass. In describing the glass of the invention, the terms "blue tint" and "blue-colored" refer to glass having a dominant wavelength in the range of 480 nanometers (nm) to 495 nm.

The present invention provides a desirable blue-colored glass composition with color and transmittance characteristics. The glass is particularly desirable for architectural and/or automotive applications. Unlike many colored glass compositions of the known art, the instant invention can be essentially free of selenium and/or cobalt. By "essentially free of selenium and/or cobalt" is meant that no intentional addition of Se and/or CoO is made to the glass composition. However, trace amounts of Se and/or CoO can be present due to contamination or other sources. By "trace amounts of Se and/or CoO" is meant in the range of 0 ppm to 3 ppm. Alternatively, in one embodiment, a small amount, e.g., less than or equal to 3 ppm, of selenium or cobalt can be intentionally added to the glass composition. Moreover, the total iron present in the glass composition can provide the glass with desirable melting characteristics, particularly for use in a conventional continuous glass-melting furnace.

Generally, the blue glass compositions of the present invention have a base portion and major colorants. By "base portion" is meant the major constituents of the glass without the major colorants. By "major colorants" is meant materials intentionally added to provide the glass with a color in a desired dominant wavelength range. Although the invention can be practiced with any type of conventional glass, the general principles of the invention will be described with respect to a conventional soda-lime-silica glass composition. A non-limiting exemplary soda-lime-silica type glass composition incorporating features of the invention has a base portion characterized as follows (all values are in weight percent based on the total weight of the glass composition):

| | |
|---|---|
| $SiO_2$ | 65 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |

As will be appreciated by one skilled in the art, $SiO_2$ is the principle component for glass. $Na_2O$ and $K_2O$ impact the melting characteristics of the glass. MgO and CaO impact glass durability and affect the divitrification temperature and viscosity of the glass during forming. $Al_2O_3$ also influences glass durability.

In the practice of the invention, major colorants comprising one or more of erbium and/or neodymium can be added to or present in this base portion at particular levels as defined below to provide the glass with the desired blue-color. In one further non-limiting embodiment, Se and/or CoO can also be added to or present in the glass composition along with Er and/or Nd.

As will be appreciated by one skilled in the art, the color of an object, and in particular glass, can be highly subjective. Observed color can depend on the lighting conditions and the preferences of the observer. In order to evaluate color on a quantitative basis, several color systems have been developed. One such system of specifying color adopted by the International Commission on Illumination (CIE) uses dominant wavelength (DW) and excitation purity (Pe). The numerical values of these two specifications for a given color can be determined by calculating the color coordinates x and y from the so-called tristimulus values X, Y, Z of that color. The color coordinates are then plotted on a 1931 CIE chromaticity diagram and numerically compared with the coordinates of CIE standard illuminant C, as identified in CIE publication No. 15.2, herein incorporated by reference. This comparison provides a color space position on the diagram to ascertain the excitation purity and dominant wavelength of the glass color.

In another color order system, the color is specified in terms of hue and lightness. This system is commonly referred to as the CIELAB color system. Hue distinguishes colors such as red, yellow, green and blue. Lightness, or value, distinguishes the degree of lightness or darkness. The numerical values of these characteristics, which are identified as $L^*$, $a^*$ and $b^*$, are calculated from the tristimulus values (X, Y, Z). $L^*$ indicates the lightness or darkness of the color and represents the lightness plane on which the color resides. $a^*$ indicates the position of the color on a red ($+a^*$) green ($-a^*$) axis. $b^*$ indicates the color position on a yellow ($+b^*$) blue ($-b^*$) axis. When the rectangular coordinates of the CIELAB system are converted into cylindrical polar coordinates, the resulting color system is know as the CIELCH color system which specifies color in terms of lightness ($L^*$), and hue angle ($H°$) and chroma ($C^*$). $L^*$ indicates the lightness or darkness of the color as in the CIELAB system. Chroma, or saturation or intensity, distinguishes color intensity or clarity (i.e., vividness vs. dullness) and is the vector distance from the center of the color space to the measured color. The lower the chroma of the color, i.e., the less its intensity, the closer the color is to being a so-called neutral color. With respect to the CIELAB system, $C^*=[(a^*)^2+(b^*)^2]^{1/2}$. Hue angle distinguishes colors such as red, yellow, green and blue and is a measure of the angle of the vector extending from the $a^*$, $b^*$ coordinates through the center of the CIELCH color space measured counterclockwise from the red ($+a^*$) axis.

It should be appreciated that color can be characterized in any of these color systems and one skilled in the art can calculate equivalent DW and Pe values; $L^*$, $a^*$, $b^*$ values; and $L^*$, $C^*$, $H°$ values from the transmittance curves of the viewed glass or composite transparency. A detailed discussion of color calculations is given in U.S. Pat. No. 5,792,559.

With respect to the values reported herein, luminous transmittance (Ltc) is determined using C.I.E. standard illuminant "C" with a 2° observer over the wavelength range of 380 to 770 nanometers as set forth in ASTM E891. Glass color, in terms of dominant wavelength and excitation purity, is determined using C.I.E. standard illuminant "C" with a 2° observer, following the procedures established in ASTM E308-90. The total solar energy transmittance (TSET) is measured over the wavelength range of 300 to 4045 nanometers and the transmittance data calculated using ASTM air mass 1.5 direct solar irradiance data and integrated using the trapezoidal rule, as is known in the art. The ultraviolet transmittance (UV) is based on NFRC (1994) Fenestration Standards and is measured over a wavelength range of 300 nm to 380 nm.

In one non-limiting embodiment of the invention, the major colorants provide the glass with a dominant wavelength in the range of 480 nm to 495 nm, such as 480 nm to 485 nm, such as 480 nm to 484 nm, at at least one thickness in the range of 4 mm to 6 mm, such as 5.6 mm. The glass can have an excitation purity in the range of 3% to 11%, such as 7% to 10%, at at least one thickness in the range of 4 mm to 6 mm, such as 5.6 mm. The major colorants can also provide the glass with solar control properties, such as IR and/or UV radiation absorbing characteristics.

In one non-limiting embodiment, the major colorants comprise iron with one or more of erbium and/or neodymium. In this non-limiting embodiment, the total iron ($Fe_2O_3$) can be present in an amount of 0.1 wt. % to 0.9 wt. %, such as 0.4 wt. % to 0.64 wt. %, such as 0.4 wt. %. The iron, typically in the form of iron oxides, provides the glass with one or more functions. For example, ferric oxide is a strong ultraviolet radiation absorber and operates as a yellow colorant in the glass. Ferrous oxide is a strong infrared radiation absorber and operates as a blue colorant. The amount of ferrous oxide and ferric oxide (with or without the presence of other major colorants) can be adjusted to provide the glass with a desired dominant wavelength in the range of 480 nm to 495 nm, such as 480 nm to 485 nm, such as 480 nm to 484 nm, at at least one thickness in the range of 4 mm to 6 mm, such as 5.6 mm. Increasing the FeO content can enable the absorption of the glass in the infrared region of the electromagnetic spectrum to be increased and the TSET to be reduced.

Cobalt oxide (CoO) operates as a blue colorant and does not exhibit any appreciable infrared or ultraviolet radiation absorbing properties.

In another non-limiting embodiment of the invention, the major colorants comprise 0.1 wt. % to 0.9 wt. % total iron ($Fe_2O_3$), up to 3 wt. % $Er_2O_3$ and/or up to 3 wt. % $Nd_2O_3$. In one particular embodiment, the total iron can range from 0.4 wt. % to 0.64 wt. %, such as 0.42 wt. % to 0.63 wt. %. In one non-limiting embodiment, the $Er_2O_3$ can range from 0.23 wt. % to 1.6 wt. %, such as 0.28 wt. % to 1.5 wt. %. In one non-limiting embodiment, the $Nd_2O_3$ can range from 0.1 to 0.25 such as 0.1 to 0.2 weight percent.

The particular combination of colorants can provide the blue glass of the invention with desirable spectral (e.g., solar control) properties as well as the aesthetically pleasing blue color. For use with architectural transparencies and non-vision vehicle transparencies (so called "privacy glass"), in one non-limiting embodiment the glass of the invention can have a visible light transmittance (Ltc) of less than or equal to 70% at at least one thickness in the range of 4 mm to 6 mm, such as 5.6 mm, for example an Ltc in the range of 64% to 70%, such as 64% to 69%, such as 64% to 68%. In another embodiment, at at least one thickness in the range of 4 mm to 6 mm, such as 5.6 mm, the glass can have a Ltc of less than or equal to 60%, such as less than or equal to 50%, such as less than or equal to 45%, such as less than or equal to 40%. In a further non-limiting embodiment, the glass can have a Ltc in the range of 35% to 45% at at least one thickness in the range of 4 mm to 6 mm, such as 5.6 mm. For automotive vision glass or other higher transmittance applications, the glass can have a Ltc of greater than or equal to 70% at a thickness of 5.6 mm.

Additionally, the glass of the invention can have a total solar energy transmittance (TSET) in the range of 30% to 50% at at least one thickness in the range of 4 mm to 6 mm, such as 5.6 mm. In one non-limiting embodiment, the glass can have a TSET in the range of 40% to 55% at a thickness of 5.6 mm, such as in the range of 45% to 50%, such as in the range of 48% to 49%. In another embodiment, the TSET can be in the range of 30% to 40% at a thickness of 5.6 mm, such as in the range of 31% to 35% or in the range of 33% to 37%.

The glass of the invention can have a UV value attractive for architectural applications. In one non-limiting embodiment, the glass can have a UV value of greater than 25% at at least one thickness in the range of 4 mm to 6 mm, such as 5.6 mm, such as greater than or equal to 27%, such as greater than or equal to 30%, such as in the range of greater than 25% to 31%. In another non-limiting embodiment, the glass can have a UV value in the range of 15% to 25% at at least one thickness in the range of 4 mm to 6 mm, such as 5.6 mm, such as in the range of 17% to 21%.

In one non-limiting embodiment, the glass can have a shading coefficient (SC) in the range of 0.3 to 0.8, such as 0.5 to 0.7, such as 0.5 to 0.6 at at least one thickness in the range of 4 mm to 6 mm, such as 5.6 mm.

In one non-limiting embodiment, the glass can have a redox ratio in the range of 0.2 to 0.6, such as in the range of 0.25 to 0.55, such as in the range of 0.29 to 0.5.

To avoid the formation of nickel sulfide stones, one non-limiting embodiment of the glass composition of the invention can be essentially nickel free. By "essentially nickel free" is meant that no deliberate addition of nickel or nickel compounds is made to the glass, although the possibility of traces of nickel due to contamination may not always be avoided. Other embodiments of the invention could include nickel. As used herein, "nickel free" means less than 3 ppm nickel.

It should be appreciated that the glass compositions disclosed herein can include small amounts of other materials, for example, melting and refining aids, tramp materials, trace materials, impurities, and similar materials not intentionally added to change or affect the color of the glass. It should be further appreciated that small amounts of additional components can be included in the glass to provide desired color characteristics and/or improve the solar performance of the glass. The glass of the present invention can be made of any thickness. The glass can generally be thicker for typical architectural applications than for typical vehicle applications. In one embodiment, the glass can have a thickness in the range of 1 mm to 20 mm, such as about 1 mm to 10 mm, such as 2 mm to 6 mm, such as 3 mm to 6 mm.

The glass compositions of the present invention can be produced from melting and refining batch material known to those skilled in the art in a continuous, large-scale, commercial glass melting operation. The melting operation can be, for example, a conventional overhead fired continuous melting operation or a multi-stage melting operation, just to name a few. The glass compositions can be formed into flat glass sheets of varying thickness by the float process in which the molten glass is supported on a pool of molten metal, usually tin, as it assumes a ribbon shape and is cooled, in a manner well known in the art.

Depending on the type of melting operation, sulfur can be added to the batch materials of the soda-lime-silica glass as a melting and refining aid. In one non-limiting embodiment, the glass of the invention can include up to about 0.5 wt. % $SO_3$, such as less than or equal to 0.3 wt. %, such as less than or equal to 0.2 wt. %, such as less than or equal to 0.18 wt. %.

Illustrating the invention are the following Examples, which are not to be considered as limiting the invention to their details.

EXAMPLES

The following examples illustrate glass compositions that embody principles of the present invention. The information in this section is based on laboratory melts. The optical and spectral properties disclosed in the following Tables are based on a reference thickness of 0.223 inch (5.66 mm), unless otherwise stated.

The following is representative of the base portion of the laboratory melts used in the following examples (all numbers are in grams):

| | |
|---|---|
| Sand | 508.99 |
| Soda Ash | 166.44 |
| Dolomite | 90.60 |
| Limestone | 76.35 |
| Salt Cake | 2.55 |
| Rouge | as required |
| Coal | as required |

Coal was added to each melt as needed to control redox. As will be appreciated by one skilled in the art, for larger or smaller size melts, the total amounts of these components could be changed but their relative proportions (e.g., relative weight percents) would be about the same. Major colorants (as described in more detail below) were added to or were present in the base portion to affect the color and/or the solar performance properties of the glass.

Table 1 shows the batch materials and spectral data for a reference commercially available blue glass composition and for glass sample numbers 1-15 prepared incorporating features of the invention. All composition values are in units of weight percent. The chemical analysis of the glass compositions was determined using a RIGAKU 3370 X-ray fluorescence spectrophotometer. The spectral characteristics of the glass were determined using a Perkin-Elmer Lambda 9 UV/VIS/NIR spectrophotometer. The redox ratios were estimated in conventional manner from the spectral data of the glass. For example, the spectral FeO was defined as equal to $\log(R_f/T_{1000})/\alpha d$, where $R_f$ equals the reflection factor (defined as 100 minus the percent surface reflectance), $T_{1000}$ equals the transmittance at 1000 nm, $\alpha$ equals the luminous absorption coefficient (which for FeO at 1000 nm is 21.5), and d equals the thickness of the glass in inches. The total iron (as $Fe_2O_3$) was determined by x-ray fluorescence. The redox ratio was then calculated as the spectral FeO divided by the total iron (as $Fe_2O_3$).

The optical characteristics, such as LTC, TSET, UV absorption, IR absorption, solar heat gain coefficient (SHGC), shading coefficient (SC), and LSG were determined in conventional manner using the WINDOWS (Version 4.0-4.1) software commercially available from the Lawrence Berkeley National Laboratory at a thickness of 0.223 inch (5.66 mm).

TABLE 1

| | Commercial Glass | Sample # | | | | | | | |
|---|---|---|---|---|---|---|---|---|---|
| | | 1 | 2 | 3 | 4 | 5 | 6 | 7 | 8 |
| Er2O3 (wt. %) | | 0 | 0 | 0 | 0.23 | 0.28 | 0.33 | 0.33 | 0.38 |
| Nd2O3 (wt. %) | | 0.1 | 0.1 | 0.1 | 0 | 0 | 0 | 0.25 | 0.25 |
| Se Added (ppm) to Batch | | 7.6 | 7.6 | 7.6 | 0 | 0 | 0 | 0 | 0 |
| Cobalt in glass | 65 | 55 | 55 | 55 | 52 | 52 | 52 | 35 | 35 |
| Se In glass (ppm) | 1.5 | 0.7 | 0.7 | 0.7 | | | | | |
| SiO2 | | 73.65 | 73.48 | 74.08 | 73.51 | 73.45 | 73.76 | 72.47 | 72.59 |
| Na2O | | 13.21 | 13.25 | 12.98 | 13.33 | 13.36 | 13.33 | 13.27 | 13.2 |
| K2O | | 0.033 | 0.035 | 0.036 | 0.028 | 0.028 | 0.027 | 0.028 | 0.028 |
| CaO | | 9.63 | 9.74 | 9.48 | 9.65 | 9.67 | 9.46 | 9.55 | 9.52 |
| MgO | | 2.73 | 2.76 | 2.69 | 2.74 | 2.76 | 2.7 | 2.72 | 2.71 |
| Al2O3 | | 0.11 | 0.12 | 0.12 | 0.09 | 0.09 | 0.09 | 0.09 | 0.09 |
| SO3 | | 0.135 | 0.116 | 0.119 | 0.13 | 0.136 | 0.12 | 0.136 | 0.118 |
| Fe2O3 | 0.455 | 0.437 | 0.441 | 0.435 | 0.431 | 0.429 | 0.428 | 0.431 | 0.431 |
| LTC | 57.00 | 57.77 | 56.8 | 57.9 | 60.5 | 60.6 | 60.5 | 61.9 | 60.9 |
| TSET | 46.74 | 43.42 | 40.5 | 41.5 | 42.8 | 43.6 | 43.4 | 43.3 | 41.8 |
| UV | 31.92 | 35.00 | 35.4 | 35.7 | 36.2 | 36.1 | 36.2 | 34.9 | 35.1 |
| IR | 35.37 | 28.88 | 24.6 | 25.8 | 26.2 | 27.3 | 27.0 | 25.9 | 23.9 |
| SC | 0.70 | 0.67 | 0.65 | 0.65 | 0.67 | 0.67 | 0.67 | 0.67 | 0.66 |
| SHGC | 0.60 | 0.58 | 0.56 | 0.56 | 0.57 | 0.58 | 0.58 | 0.58 | 0.56 |
| TVIS/SHGC (LSG) | 0.95 | 1.00 | 1.01 | 1.03 | 1.06 | 1.04 | 1.04 | 1.07 | 1.09 |
| DW | 482.01 | 481.96 | 482.07 | 482.24 | 481.39 | 481.12 | 480.88 | 481.47 | 481.28 |
| Pe | 12.17 | 14.73 | 15.80 | 14.79 | 15.31 | 15.13 | 15.20 | 14.45 | 15.14 |
| x | 0.2824 | 0.2766 | 0.27 | 0.28 | 0.28 | 0.28 | 0.28 | 0.28 | 0.28 |
| y | 0.2969 | 0.2928 | 0.29128 | 0.29 | 0.29 | 0.29 | 0.29 | 0.29 | 0.29 |
| L* | 80.79 | 81.40 | 80.9269 | 81.50 | 82.95 | 82.98 | 82.91 | 83.67 | 83.18 |
| a* | −5.17 | −6.55 | −7.1510 | −6.7505 | −6.1422 | −5.7461 | −5.4868 | −6.21 | −6.2549 |
| b* | −9.87 | −11.96 | −12.69 | −11.88 | −12.96 | −12.97 | −13.17 | −12.16 | −12.81 |
| Redox | 0.231 | 0.289 | 0.329 | 0.322 | 0.324 | 0.314 | 0.318 | 0.319 | 0.341 |

| | Sample # | | | | | | |
|---|---|---|---|---|---|---|---|
| | 9 | 10 | 11 | 12 | 13 | 14 | 15 |
| Er2O3 (wt. %) | 0.43 | 0.5 | 0.85 | 1.2 | 1.6 | 1.6 | 1.6 |
| Nd2O3 (wt. %) | 0.25 | 0 | 0 | 0 | 0 | 0 | 0 |
| Se Added (ppm) to Batch | 0 | 0 | 0 | 0 | 0 | 0 | 0 |
| Cobalt in glass | 35 | 49 | 49 | 49 | | | |
| Se In glass (ppm) | | | | | | | |
| SiO2 | 72.34 | 72.89 | 72.02 | 71.9 | 71.2 | 71.58 | 71.87 |
| Na2O | 13.3 | 13.01 | 13.13 | 12.94 | 12.96 | 12.86 | 12.74 |

TABLE 1-continued

| K2O | 0.029 | 0.03 | 0.03 | 0.03 | 0.029 | 0.028 | 0.028 |
|---|---|---|---|---|---|---|---|
| CaO | 9.58 | 9.38 | 9.46 | 9.21 | 9.26 | 9.11 | 8.95 |
| MgO | 2.72 | 2.68 | 2.69 | 2.63 | 2.65 | 2.61 | 2.58 |
| Al2O3 | 0.09 | 0.11 | 0.1 | 0.11 | 0.11 | 0.1 | 0.1 |
| SO3 | 0.128 | 0.119 | 0.144 | 0.145 | 0.057 | 0.037 | 0.035 |
| Fe2O3 | 0.436 | 0.636 | 0.643 | 0.632 | 0.527 | 0.52 | 0.52 |
| LTC | 61.7 | 55.0 | 54.8 | 54.0 | 64.3 | 45.9 | 23.6 |
| TSET | 43.1 | 32.3 | 33.9 | 34.0 | 31.0 | 17.6 | 10.0 |
| UV | 34.8 | 25.1 | 22.9 | 21.8 | 31.0 | 9.7 | 0.3 |
| IR | 25.7 | 13.8 | 16.2 | 16.8 | 7.6 | 4.0 | 3.5 |
| SC | 0.67 | 0.58 | 0.59 | 0.59 | 0.57 | 0.46 | 0.40 |
| SHGC | 0.57 | 0.50 | 0.51 | 0.51 | 0.49 | 0.40 | 0.35 |
| TVIS/SHGC (LSG) | 1.08 | 1.10 | 1.07 | 1.06 | 1.31 | 1.15 | 0.67 |
| DW | 481.02 | 482.46 | 481.21 | 479.99 | 482.60 | 569.43 | 578.93 |
| Pe | 14.47 | 16.58 | 15.53 | 15.43 | 11.58 | 36.22 | 91.61 |
| x | 0.28 | 0.27 | 0.28 | 0.28 | 0.28 | 0.36 | 0.49 |
| y | 0.29147 | 0.2909 | 0.29 | 0.28794 | 0.29877 | 0.40406 | 0.47878 |
| L* | 83.5553 | 79.9151 | 79.7091 | 79.2367 | 84.7263 | 72.5264 | 53.2964 |
| a* | −5.6956 | −7.7648 | −5.6666 | −4.2114 | −5.1785 | −8.0251 | 11.7281 |
| b* | −12.43 | −12.86 | −12.80 | −13.35 | −9.41 | 31.58 | 74.63 |
| Redox | 0.318 | 0.339 | 0.304 | 0.301 | 0.554 | 0.716 | 0.741 |

It should be noted that Sample Nos. 14 and 15 were amber in color and not within the desired DW range.

Table 2 shows the composition and spectral data for glass samples 16-30 made in accordance with the invention.

TABLE 2

| | Sample# | | | | | | | |
|---|---|---|---|---|---|---|---|---|
| | 16 | 17 | 18 | 19 | 20 | 21 | 22 | 23 |
| Er2O3 (wt. %) | | | | 1.6 | 1.6 | 1.6 | 0.3 | 0.3 |
| Nd2O3 (wt. %) | 0.1 | 0.1 | 0.1 | | | | | |
| Se Added to Batch (ppm) | 7.6 | 7.6 | 7.6 | | | | | |
| Cobalt in glass (ppm) | 58 | 58 | 58 | | | | 42 | 42 |
| Se in glass (ppm) | | | | | | | | |
| SiO2 | 73.49 | 73.59 | 73.88 | 71.16 | 71.11 | 71.08 | 73.15 | 73.18 |
| Na2O | 13.34 | 13.25 | 13.26 | 12.91 | 12.98 | 12.97 | 13.49 | 13.48 |
| K2O | 0.028 | 0.028 | 0.029 | 0.027 | 0.027 | 0.027 | 0.029 | 0.028 |
| CaO | 9.63 | 9.63 | 9.4 | 9.25 | 9.29 | 9.26 | 9.76 | 9.76 |
| MgO | 2.74 | 2.74 | 2.68 | 2.65 | 2.65 | 2.65 | 2.77 | 2.77 |
| Al2O3 | 0.09 | 0.1 | 0.1 | 0.1 | 0.09 | 0.09 | 0.09 | 0.09 |
| SO3 | 0.169 | 0.156 | 0.142 | 0.088 | 0.07 | 0.063 | 0.169 | 0.169 |
| Fe2O3 | 0.451 | 0.449 | 0.442 | 0.525 | 0.529 | 0.522 | 0.444 | 0.442 |
| LTC | 55.50 | 56.7 | 56.1 | 67.4 | 66.1 | 65.0 | 63.8 | 63.7 |
| TSET | 43.20 | 43.5 | 43.1 | 35.7 | 33.7 | 31.8 | 46.6 | 46.8 |
| UV | 32.25 | 33.7 | 33.4 | 28.4 | 29.6 | 31.3 | 34.4 | 34.5 |
| IR | 30.14 | 29.9 | 29.4 | 12.8 | 10.6 | 8.5 | 30.9 | 31.2 |
| SC | 0.67 | 0.67 | 0.67 | 0.61 | 0.59 | 0.58 | 0.70 | 0.70 |
| SHGC | 0.57 | 0.58 | 0.57 | 0.52 | 0.51 | 0.50 | 0.60 | 0.60 |
| (LSG) | 0.97 | 0.98 | 0.98 | 1.30 | 1.30 | 1.30 | 1.06 | 1.06 |
| DW | 481.82 | 481.83 | 481.72 | 481.92 | 482.20 | 482.39 | 481.82 | 481.68 |
| Pe | 13.90 | 14.43 | 14.78 | 8.22 | 9.60 | 11.11 | 12.17 | 12.31 |
| x | 0.2786 | 0.2774 | 0.2766 | 0.2914 | 0.2882 | 0.2846 | 0.2825 | 0.2823 |
| y | 0.2938 | 0.2930 | 0.2922 | 0.3031 | 0.3013 | 0.2992 | 0.2966 | 0.2962 |
| L* | 80.05 | 80.75 | 80.45 | 86.10 | 85.56 | 85.03 | 84.51 | 84.50 |
| a* | −5.86 | −6.20 | −6.22 | −3.04 | −3.87 | −4.75 | −5.23 | −5.16 |
| b* | −11.25 | −11.73 | −12.04 | −7.02 | −8.04 | −9.17 | −10.24 | −10.44 |
| Redox | 0.271 | 0.275 | 0.283 | 0.424 | 0.466 | 0.525 | 0.271 | 0.270 |

| | Sample# | | | | | | |
|---|---|---|---|---|---|---|---|
| | 24 | 25 | 26 | 27 | 28 | 29 | 30 |
| Er2O3 (wt. %) | 0.3 | 1.5 | 1.5 | 1.5 | | | |
| Nd2O3 (wt. %) | | | | | 0.1 | 0.1 | 0.1 |
| Se Added to Batch (ppm) | | | | | 8.6 | 10.7 | 12.9 |
| Cobalt in glass (ppm) | 42 | 6 | 6 | 6 | 54 | 54 | 54 |
| Se in glass (ppm) | | | | | 1.7 | 1.9 | 2.2 |
| SiO2 | 73.32 | 71.4 | 71.71 | 71.73 | 73.36 | 73.42 | 73.66 |
| Na2O | 13.49 | 12.95 | 12.78 | 12.85 | 13.38 | 13.39 | 13.33 |
| K2O | 0.028 | 0.028 | 0.028 | 0.029 | 0.028 | 0.03 | 0.029 |
| CaO | 9.65 | 9.24 | 9.14 | 9.08 | 9.7 | 9.65 | 9.52 |

TABLE 2-continued

| | | | | | | | |
|---|---|---|---|---|---|---|---|
| MgO | 2.74 | 2.66 | 2.64 | 2.64 | 2.77 | 2.75 | 2.71 |
| Al2O3 | 0.09 | 0.1 | 0.1 | 0.1 | 0.09 | 0.09 | 0.09 |
| SO3 | 0.159 | 0.063 | 0.068 | 0.066 | 0.17 | 0.163 | 0.159 |
| Fe2O3 | 0.439 | 0.524 | 0.515 | 0.527 | 0.441 | 0.444 | 0.437 |
| LTC | 64.2 | 64.1 | 64.4 | 64.0 | 56.6 | 56.6 | 55.7 |
| TSET | 46.6 | 32.7 | 33.3 | 32.5 | 44.1 | 44.4 | 43.7 |
| UV | 35.1 | 29.8 | 29.7 | 29.9 | 32.4 | 32.2 | 32.1 |
| IR | 30.6 | 10.0 | 10.7 | 9.8 | 31.1 | 31.6 | 31.0 |
| SC | 0.69 | 0.58 | 0.59 | 0.58 | 0.68 | 0.68 | 0.67 |
| SHGC | 0.60 | 0.50 | 0.51 | 0.50 | 0.58 | 0.58 | 0.58 |
| (LSG) | 1.07 | 1.28 | 1.26 | 1.28 | 0.98 | 0.98 | 0.96 |
| DW | 481.76 | 482.07 | 481.95 | 482.08 | 482.13 | 482.10 | 482.09 |
| Pe | 12.25 | 11.29 | 10.94 | 11.41 | 12.51 | 12.53 | 11.69 |
| x | 0.2823 | 0.2844 | 0.2852 | 0.2841 | 0.2816 | 0.2815 | 0.2835 |
| y | 0.2964 | 0.2984 | 0.2988 | 0.2982 | 0.2966 | 0.2965 | 0.2978 |
| L* | 84.74 | 84.58 | 84.73 | 84.54 | 80.59 | 80.58 | 80.02 |
| a* | −5.23 | −4.58 | −4.32 | −4.65 | −5.53 | −5.51 | −5.00 |
| b* | −10.37 | −9.42 | −9.19 | −9.51 | −10.05 | −10.08 | −9.39 |
| Redox | 0.276 | 0.483 | 0.476 | 0.487 | 0.27 | 0.264 | 0.273 |

Primarily because of the high iron content, the glass formed from these compositions has an Ltc of less than 70% and a TSET of less than 50%. The blue color of the glass along with these solar performance characteristics make the glass particularly useful for architectural applications, such as for architectural windows for buildings along or adjacent to a coastline.

TABLE 3

| | Sample # | | | | | |
|---|---|---|---|---|---|---|
| | 31 | 32 | 33 | 34 | 35 | 36 |
| Er2O3 (wt. %) | 0.4 | 0.45 | 0.5 | 0.8 | 0.85 | 0.9 |
| Nd2O3 (wt. %) | 0.25 | 0.25 | 0.25 | | | |
| Added Cobalt (ppm) | 29 | 29 | 29 | 40 | 40 | 40 |
| SiO2 | 72.37 | 72.43 | 72.28 | 73.20 | 73.25 | 73.40 |
| Na2O | 13.25 | 13.21 | 13.26 | 13.40 | 13.39 | 13.29 |
| K2O | 0.028 | 0.028 | 0.029 | 0.028 | 0.028 | 0.030 |
| CaO | 9.54 | 9.49 | 9.5 | 9.59 | 9.56 | 9.49 |
| MgO | 2.71 | 2.7 | 2.71 | 2.74 | 2.72 | 2.73 |
| Al2O3 | 0.09 | 0.09 | 0.09 | 0.09 | 0.09 | 0.09 |
| SO3 | 0.166 | 0.167 | 0.166 | 0.169 | 0.168 | 0.172 |
| Fe2O3 | 0.435 | 0.432 | 0.435 | 0.641 | 0.644 | 0.634 |
| LTC | 64.61 | 64.3 | 64.6 | 58.8 | 58.5 | 58.7 |
| TSET | 47.67 | 47.5 | 48.1 | 37.8 | 37.3 | 38.0 |
| UV | 33.40 | 33.1 | 33.0 | 22.1 | 21.9 | 22.2 |
| IR | 31.79 | 31.6 | 32.5 | 20.4 | 19.8 | 20.8 |
| SC | 0.70 | 0.70 | 0.71 | 0.62 | 0.62 | 0.63 |
| SHGC | 0.61 | 0.60 | 0.61 | 0.54 | 0.53 | 0.54 |
| (LSG) | 1.06 | 1.07 | 1.06 | 1.09 | 1.10 | 1.09 |
| DW | 481.42 | 481.14 | 480.81 | 482.01 | 481.88 | 481.49 |
| Pe | 11.85 | 11.93 | 11.65 | 12.06 | 12.15 | 12.03 |
| x | 0.2834 | 0.2834 | 0.2842 | 0.2827 | 0.2825 | 0.2830 |
| y | 0.2966 | 0.2960 | 0.2960 | 0.2971 | 0.2968 | 0.2964 |
| L* | 84.95 | 84.80 | 84.92 | 81.83 | 81.64 | 81.74 |
| a* | −5.08 | −4.84 | −4.44 | −5.06 | −4.96 | −4.56 |
| b* | −10.10 | −10.29 | −10.21 | −9.77 | −9.90 | −10.00 |
| Redox | 0.262 | 0.265 | 0.257 | 0.262 | 0.267 | 0.262 |

The samples shown in Tables 1, 2, and 3 include a range of glasses that are both "spectrally selective" and non-spectrally selective using Er and Nd as components of the glass composition. Samples 13, 21, 25, 26, and 27 demonstrate spectrally selective blue glasses. Sample numbers 22, 23, and 24 are glasses that exhibit similar color but are not "spectrally selective". Samples 14 and 15 were too reduced and were amber in color rather than blue. As can be seen from Tables 1-3, the present invention can be used to make glass having color and transmittance characteristics similar to those of the conventional blue glass.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

We claim:
1. A blue glass composition, comprising:
a base portion comprising:

| | |
|---|---|
| $SiO_2$ | 65 to 75 weight percent, |
| $Na_2O$ | 10 to 20 weight percent, |
| CaO | 5 to 15 weight percent, |
| MgO | 0 to 5 weight percent, |
| $Al_2O_3$ | 0 to 5 weight percent, |
| $K_2O$ | 0 to 5 weight percent, and | a major colorant portion comprising:

| | |
|---|---|
| $Fe_2O_3$ (total iron) | 0.1 to 0.9 weight percent, and | a combination of

| | |
|---|---|
| $Er_2O_3$ | 0.1 to 3 weight percent and |
| $Nd_2O_3$ | 0.1 to 3 weight percent, | wherein the glass is characterized by a dominant wavelength in the range of 480 nm to 495 nm and a light to solar gain ratio in the range of 0.9 to 1.5 at least one thickness in the range of 4 mm to 6 mm wherein the glass is essentially free of cobalt and/or selenium.

2. The blue glass composition according to claim 1, wherein the glass comprises 0.1 to 1 weight percent $Nd_2O_3$.

3. The blue glass composition according to claim 1, wherein the total iron is in the range of 0.4 to 0.6 weight percent.

4. The blue-tint glass composition according to claim 1, wherein the glass has an LSG of greater than or equal to 1.25.

5. The blue glass composition according to claim 1, wherein the dominant wavelength is 480 nm to 485 nm.

6. The blue glass according to claim 1, further comprising $SO_3$ less than or equal to 0.17.

7. The blue glass according to claim 1, wherein the glass has a TVIS in the range of 50 percent to 67 percent at a thickness of 5.6 mm.

8. The blue glass according to claim 1 wherein the glass has a TSET in the range of 30 percent to 46 percent at a thickness of 5.6 mm.

9. The blue glass according to claim 1, wherein the glass has a shading coefficient in the range of 0.40 to 0.70 at a thickness of 5.6 mm.

10. The blue glass according to claim 1, wherein the glass has a UV value in the range of 20% to 36% at a thickness of 5.6 mm.

11. The blue glass composition according to claim 1, wherein the glass has a redox ratio in the range of 0.2 to 0.6.

* * * * *